July 19, 1927.
P. B. CAMP
1,636,284
BRAKE MECHANISM FOR RAILWAY CARS
Filed May 21, 1923
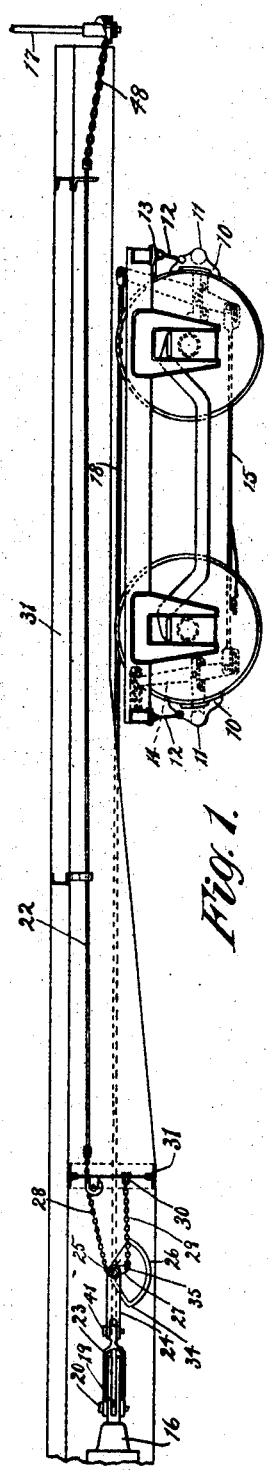
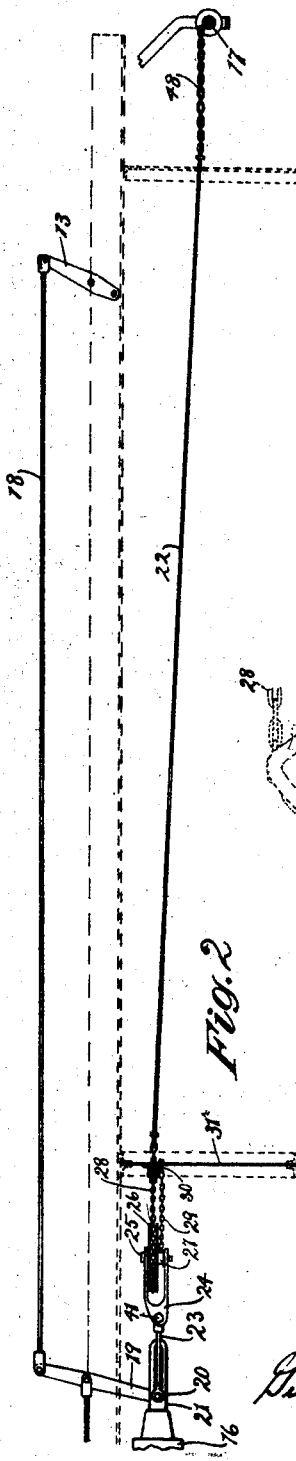
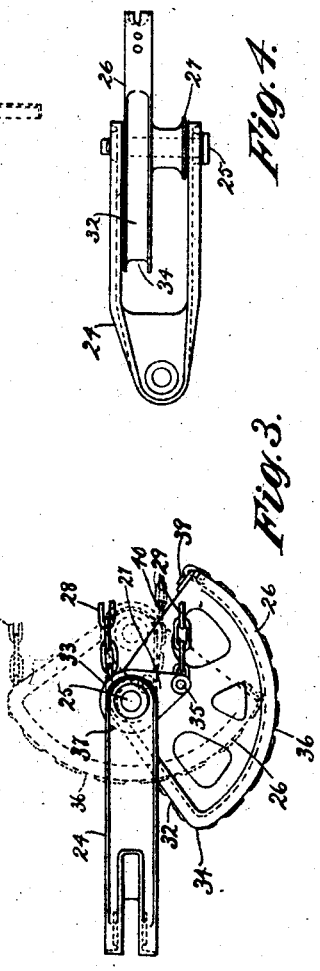
Inventor:
Percy B. Camp
Gillson & Mann
Atty's.

Patented July 19, 1927.

1,636,284

UNITED STATES PATENT OFFICE.

PERCY B. CAMP, OF MAYWOOD, ILLINOIS, ASSIGNOR TO UNIVERSAL DRAFT GEAR ATTACHMENT COMPANY, A CORPORATION OF ILLINOIS.

BRAKE MECHANISM FOR RAILWAY CARS.

Application filed May 21, 1923. Serial No. 640,402.

Proper application of brakes requires a quick take-up of the slack followed by powerful application of pressure of shoes and the force available for the work is limited. The principal object of this invention is to equip brake mechanisms with a lever device that will first multiply the speed of the applied force and then multiply the power of that force with reduced speed.

Other objects and advantages of the invention will become apparent as the description is read in connection with the accompanying drawings in which Figs. 1 and 2 are side elevation and plan view respectively, illustrating the brake mechanism at one end of the car equipped according to the present invention;

Figs. 3 and 4 are side elevation and plan view respectively of the multiplied lever device and its mounting shown in an enlarged scale.

The brake shoes are shown at 10 mounted on brake beams 11 carried by suspending links 12 from any suitable support. The shoes are applied through levers 13 and 14 which are connected for joint operation by a link 15. The power is transmitted to the lever 13 either from an air cylinder 16 or a brake staff 17 through a rod 18, and a brake lever 19. The brake lever is connected by pin 20 to a push rod 21 that is operated by a piston in the cylinder 16. The same pin 20 connects the lever 19 to a rod or the like that is operated by the brake staff 17 through a winding chain 48. All this structure is old and well known and is selected merely to illustrate one application of the present invention.

The multiplying lever is here interposed between the hand brake rod 22 and the lever 19. The pin 20 connects a shackle 23 to the lever 19 and the shackle is connected to a forked mounting 24 in which the multiplying lever is rotatably mounted on the pintle bolt 25, whereby said multiplying lever is supported principally from said push rod 21 while in inoperative position.

The lever is equipped with two arms 26 and 27, the former being connected by a chain 28 with the hand brake rod 22 and the latter by a chain 29 with an anchorage 30 on the under frame 31 of the car.

These arms 26 and 27 are arranged to take advantage of the fact that a point traveling in a circle will, in one arc move principally in one direction, and in another arc will move principally transversely to that direction. In Fig. 3 the lever is shown in normal traveling position and the line 32 indicates the length of the arm 26. Due to the location of the arms with respect to the chains 28 and 29, a slight movement of the chain 28 will cause the lever to rotate rapidly and the pintle 25 to travel rapidly to the right in the drawing. This is because a very slight movement to the right on the part of the chain 28 will cause the line 32 to revolve clockwise through a considerable angle, which revolution will also be taken by the arm 27, but the point 34 on the line 32 will move principally transverse to the movement of the chain 28, whereas the similar point 35 on the arm 27 will move principally in the direction of the force transmitted to the chain 29. Consequently, a slight rotation of the brake staff 17 serves to rotate the lever and move it together with the mounting 24 to the dotted line position shown in Fig. 3, which is sufficient to take up the slack in the average brake gear.

Further movement of the chain 28 to the right, due to the change of relation of the point 34, will cause the multiplying lever to rotate slowly but the chain will operate with correspondingly increased leverage; and in addition the position of the point 35 relative to the direction of the force transmitted to the chain 29 will have also changed so as to increase the mechanical advantage of the lever device.

It is necessary to provide the application of the brake pressure through a considerable range and this may be accomplished by equipping the arm 26 with the drum-like working surface 36 and the arm 27 with the drum-like working surface 37. The drum surface 36 serves to continue the arm 26 and long leverage through a wide angle of rotation and the drum surface 37 continues the arm 27 with short leverage through a similar angle of rotation.

By varying the relative position of the line 32 and arm 27 the take-up can be varied to suit different conditions. Where only a small amount of slack is to be taken up it may be found sufficient to make use of the speed gained by either the arm 26 or the arm 27 and in that case one of the arms may take the form of a complete drum. Where a greater amount of slack is to be taken up it may be accomplished by a change in the length of the arms or by an obvious change in the relationship between them and the applied and transmitted forces.

A particular construction here shown permits the arm 26 to be made in the form of a sector having a substantially radial leading face grooved along the line 32 and along the drum surface to receive the chain 28, one end of which is secured by a shackle 39 to the following face 40 of the arm and the other end of which is secured to the free end of the rod 22. And the arm 27 is a relatively short projection which is continued in the drum surface 37, both being grooved as at 33 to receive the chain 29.

Due to the multiplying effect of the lever device, the force transmitted from the arm 27 is much greater than that applied to the arm 26 and for that reason the pin 41, by which the mounting 24 is connected to the shackle 23, is offset to the side corresponding to the arm 27. This may be accomplished by making the fork in the mounting a little one-sided, or otherwise, as may be desired.

I claim as my invention:

1. In a brake mechanism for railway cars, a brake, a power device for operating the brake and an extensible and contractable connection between them including a rotatably mounted multiplying lever having two laterally spaced arms, one of said arms being in the form of a segment having a substantially radial leading face, means for connecting said segment to said power device, said means engaging said leading face during the initial movement of said power device, means for connecting the other arm to an anchorage and means including a pivot for rotatably mounting the lever and transmitting force therefrom to the brake.

2. In a brake mechanism for railway cars, a brake, a power device for operating the brake and an extensible and contractable connection between them including a rotatably mounted multiplying lever having two laterally spaced arms, means including a pivot for rotatably mounting the lever and connecting it to the brake, one of said arms having a segmental drum surface of long leverage and having a substantially radial leading face, a cable cooperating with said drum surface and connected with the power device, the other arm having a drum surface of short leverage and a radially extending projection, and a cable secured to said projection and connected with an anchorage.

3. In a brake mechanism for railway cars, a brake, a power device for operating the brake, and an extensible and contractable connection between them including a rotatably mounted multiplying lever having two individual arms, one of said arms being segmental, and having a substantially radial leading face, a cable connecting the other of said arms with an anchorage, a mounting in which the lever is journaled and which is adapted to travel transversely to the axis of rotation of said lever when the brake is applied, and a cable connecting the segmental arm to said power device, said cable extending along said radial face in the inoperative position of said brake.

4. In a brake mechanism for railway cars, the combination of a brake lever, a source of power, a link connected with the brake lever, a multiplying lever rotatably mounted in the link and having two individual arms, one of said arms being in the form of a segment having a substantially radial leading face, means for connecting one of said arms to an anchorage and means for connecting the other arm to the source of power, said means engaging said radial face during the initial operation of said brake mechanism, said arms being so arranged that said leading face will first move in a direction principally transverse to said means, and then in a direction principally parallel therewith, and the other arm will first move principally in a direction parallel with said means, and then in a direction principally transverse thereto during the application of the brakes.

5. In a brake mechanism for railway cars, the combination of a brake lever, a source of power, and an expansible and contractable connection between them including a lever having two individual arms, one arm being provided with a segmental drum surface of long leverage and having a leading face spaced angularly from the other arm, a cable cooperating with the segmental drum surface and engaging said leading face in the inoperative position of said lever, said cable being connected with the power device, and a cable connecting the other arm with an anchorage.

6. In a brake mechanism for railway cars, a brake, a power device for operating the brake and an expansible and contractable connection between them including a traveling mounting, a rotatable multiplying lever journaled in the mounting and having two individual arms, one of said arms being in the form of a segment having a substantially radial leading face, a connection between the mounting and the brake, a connection between one of said arms and the power device and a connection between the other arm and an anchorage, said arms being so arranged that said leading face will first move in a direction principally transverse to said connection, and then in a direction principally parallel therewith, and the other arm will first move principally in a direction parallel with said connection and then in a direction principally transverse thereto, during the application of the brakes.

7. In a brake mechanism for railway cars, a brake, a lever for operating said brake, means including a push rod for operating said lever, a brake staff, an expansible and contractable connection between said staff and lever for manually operating said brake, said connection comprising a traveling mounting supported principally by said push rod, a rotatable multiplying lever journaled in said mounting and having two individual arms, means for transmitting force from the mounting to the brake, means for transmitting force from the power device to one of said arms and means for connecting the other arm with an anchorage, the first arm being arranged to first move principally in a direction transverse to the applied force.

8. In a brake mechanism for railway cars, a brake, a power device for operating the brake and an expansible and contractable connection between them including a traveling mounting, a rotatable multiplying lever journaled therein and having two individual arms, means for transmitting force from the mounting to the brake, means for transmitting force from the power device to one of said arms and means for connecting the other arm with an anchorage, the last arm being arranged to first move principally in a direction parallel to the force transmitted to the anchorage for taking up the slack, and then transverse thereto for setting the brakes.

9. In a brake mechanism for railway cars, the combination of a multiplying lever having two laterally spaced arms arranged to make the force transmitted by one of them greater than the force applied by the other, a mounting in which the lever is journaled and means for transmitting force from the mounting connected thereto in an off-set position corresponding to the difference between the applied and the transmitted forces.

PERCY B. CAMP.